United States Patent [19]

Matsushita et al.

[11] Patent Number: 4,891,172
[45] Date of Patent: Jan. 2, 1990

[54] PROCESS FOR PRODUCING DOUBLE-CAPSULES

[75] Inventors: Toshihiko Matsushita, Funabashi; Sadao Morishita, Ibaraki, both of Japan

[73] Assignee: Mitsubishi Paper Mills, Ltd., Tokyo, Japan

[21] Appl. No.: 464,603

[22] Filed: Feb. 7, 1983

Related U.S. Application Data

[63] Continuation of Ser. No. 175,740, Aug. 6, 1980, abandoned.

[30] Foreign Application Priority Data

Oct. 15, 1979 [JP] Japan ................................ 54-132543

[51] Int. Cl.⁴ .............................................. B01J 13/02
[52] U.S. Cl. ...................................... 264/4.33; 264/4.3; 264/4.7; 428/321.5; 428/914; 503/215; 512/4
[58] Field of Search .......................... 264/4.3, 4.7, 4.33

[56] References Cited

U.S. PATENT DOCUMENTS 3,429,827  2/1969  Ruus .............................. 264/4.7 X
3,755,190  8/1973  Hart et al. ....................... 264/4.7 X
4,001,140  1/1977  Foris et al. ...................... 264/4.7 X

FOREIGN PATENT DOCUMENTS 47-23165  6/1972  Japan ................................. 264/4.7
1257178  12/1971  United Kingdom ................. 264/4.3

OTHER PUBLICATIONS

Research Society for Microcapsules: "New Microencapsulation Techniques and Their Applications", Publication Dep't., Management Dev. Center, Japan, Sep. 10, 1978.

Primary Examiner—Richard D. Lovering
Attorney, Agent, or Firm—Cushman, Darby & Cushman

[57] ABSTRACT

An improved process for producing double-capsules by dispersing in a hydrophobic substance a dispersion of microcapsules containing as the core material a hydrophilic substance or a hydrophobic substance, the latter of which is the same as or different from the first named hydrophobic substance, wherein the improvement is characterized in that the first named hydrophobic substance has a viscosity of 40 to 150,000 cps at 25° C.

6 Claims, 1 Drawing Sheet

PROCESS FOR PRODUCING DOUBLE-CAPSULES

This is a continuation of application Ser. No. 175,740 filed Aug. 6, 1980, now abandoned.

This invention relates to a process for producing double-capsules with the inclusion of microcapsules containing a hydrophilic or hydrophobic substance.

The heretofore known manufacturing processes for microcapsules include coacervation method, interfacial polymerization method and in situ method.

The coacervation method utilizes the phenomenon of phase separation of a colloidal solution which is caused by the electrical interaction between a polycationic colloid and a polyanionic colloid (U.S. Pat. Nos. 2,800,457 and 2,800,458).

In the interfacial polymerization method, a dispersion medium and a core material dispersed therein contain monomers different from each other and polymerization or condensation is allowed to take place at the interface, that is, at the surface of the core material to form a microcapsule wall membrane of the resulting polymer (Japanese Patent Publication Nos. 446/67, 2,882/67 and 2,883/67).

In the in situ method, the monomeric materials for forming the wall membrane and a polymerization catalyst are supplied solely from the inside or outside of a core substance and polymerization or condensation is allowed to take place under such conditions that the reaction will take place on the surface of the core substance to form a microcapsule wall membrane of the resulting polymer (Japanese Patent Publication Nos. 9168/61 and 23165/72, U.S. Pat. Nos. 3,755,190 and 4,001,140).

The term "double-capsule", as herein used, means not a double-coated capsule having a wall membrane of double thickness but a microcapsule containing smaller microcapsules, which is prepared by a two-step process in which a dispersion of microcapsules is further dispersed in a hydrophobic substance and the resulting suspension of microcapsules is enclosed in larger microcapsules.

The microcapsules to be enclosed (hereinafter these microcapsules are referred to as primary capsules) can be those prepared by the aforementioned encapsulation methods. The primary capsules containing a hydrophobic substance as core material are generally prepared by using water as the manufacturing vehicle. In a conventional process for producing double-capsules the aqueous slurry of primary capsules is freed from water to be transformed into apparent solid form and the resulting "dry" microcapsules are redispersed in a hydrophobic substance and encapsulated or, alternatively, the aqueous slurry of microcapsules is used as the core material and encapsulated by a method such as interfacial polymerization to form double-capsules. Such a process is unsuitable for actual use, because of complicated procedures such as water removal from the slurry, necessity of employing a plurality of different encapsulation procedures, or necessity of employing different kinds of wall membrane materials if the same encapsulation procedure is used.

In order to overcome the above difficulties the present inventors conducted extensive studies and, as a result, found that double-capsules may easily be produced by an improved process in which primary capsules containing as the core material a hydrophilic or hydrophobic substance are further dispersed in a hydrophobic substance, which is the same as or different from said hydrophobic substance and which has a viscosity in the range from 40 to 150,000 cps at 25° C. Based on this finding, the present invention has been accomplished.

An object of this invention is to provide a process for producing double-capsules with the inclusion of primary capsules containing a hydrophilic or hydrophobic substance.

Other objects and advantages of this invention will become apparent from the following description.

BRIEF DESCRIPTION OF THE DRAWINGS

In the accompanying drawings.

Figure 1:
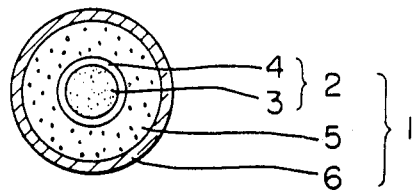
FIGS. 1 and 2 are schematic representation of the embodiments of this invention. In the Figures, 1 is a double-capsule, 2 a primary capsule, 3 a hydrophobic or hydrophilic substance, 4 the wall membrane of a primary capsule, 5 a hydrophobic substance, and 6 the wall membrane of a double-capsule.
Figure 2:
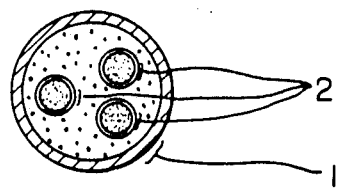

The invention is described below in further detail.

The primary capsules to be enclosed in the double-capsules may be prepared by any of the aforementioned encapsulation processes. However, the core substance varies with the encapsulation process. In the interfacial polymerization method and the in situ method, the core substance may be either hydrophilic or hydrophobic, provided the wall material is properly selected. In the coacervation method, the core substance is necessarily limited to a hydrophobic substance which may be a solid, because the wall material is a hydrophilic colloid. When the dispersion medium in the dispersion of primary capsules which were formed is hydrophobic and the dispersion medium to be enclosed in the double capsules is also hydrophobic, the preparation of double-capsules is comparatively easy, because both media are hydrophobic. To the contrary, when the primary capsules were obtained as a suspension in a hydrophi.. medium, particularly water. which is difficulty compatible with a hydrophobic medium to be used in the core material of double-capsules, it was impossible heretofore to prepare double-capsules. Consequently, in the past it was necessary to transform the suspension of primary capsules into solid form by removing the hydrophilic medium and to redisperse the resulting solid in a hydrophobic medium to be used in the core material of the double-capsules.

As a result of extensive studies on the above difficulties, the present inventors discovered a method for producing double-capsules, wherein a physical property of the hydrophobic core substance of the double-capsules is specified. The object of this invention has been achieved by maintaining the viscosity of the hydrophobic core substance within the range of 40 to 150,000 cps at 25° C. in the microcapsules formed by the in situ method using as the wall material a urea-formaldehyde polymer, melamine-formaldehyde polymer, or methylolmelamine-formaldehyde polymer. Although the relationship between a hydrophobic substance and water is not clearly understood, when primary capsules in the form of aqueous suspension are mixed with a hydrophobic substance having a viscosity in the specified range of 40 to 150,000 cps at 25° C., the primary capsules become dispersed in said hydrophobic substance which displaces the aqueous medium of the dispersion of primary capsules. Therefore, it has become possible to disperse primary capsules in a hydrophobic substance to be enclosed in double-capsules by using primary capsules in the form of aqueous suspension as such.

As to the viscosity of hydrophobic substance, if the viscosity is lower than 40 cps, the hydrophobic substance becomes dispersed in the aqueous medium of the suspension of primary capsules, forming an aqueous suspension of primary capsules as well as minute droplets of the hydrophobic substance; both dispersed phases will become covered with a protective colloid in the subsequent emulsification treatment, making it impossible to replace the aqueous medium surrounding the primary capsules with the hydrophobic substance. If the encapsulation operation is carried on to the final stage, there will be formed an aqueous dispersion of two kinds of mononuclear particles, the one being the primary capsules with double walls and the other being microcapsules containing the hydrophobic substance. On the other hand, if the viscosity of a hydrophobic substance is higher than 150,000 cps, the primary capsules are difficulty dispersible and the subsequent emulsification becomes impossible. It was thus found that the suitable range of viscosity of a hydrophobic substance is 40 to 150,000, preferably 100 to 10,000, most preferably 300 to 8,000 cps.

The primary capsules being enclosed may be prepared by any of the encapsulation methods so long as they can withstand the subsequent dispersing and emulsifying treatment in preparing double-capsules. The size of primary capsules is subject to no particular restriction. It is easy to increase the size of double-capsules to meet the increased size of primary capsules.

The weight ratio of the dispersion of primary capsules to the hydrophobic core substance of the double-capsules should be in the range of from 3:1 to 1:3, preferably from 2:1 to 1:2 for the following reasons: If the ratio exceeds the upper limit, the primary capsules will be difficulty covered with a uniform layer of the hydrophobic substance and become microcapsules with double walls, while if the ratio is decreased below the lower limit, the primary capsules will be covered with unnecessarily large amounts of the hydrophobic substance.

Emulsification for producing double-capsules is performed by means of a commonly used homogenizer under suitable conditions for obtaining a desired capsules size.

The hydrophobic substances used in this invention are liquid substances such as, for example, vegetable oils, animal oils, mineral oils, synthetic oils, fragrances, reactants and the like, or dispersions of solids in said liquid substances. When the viscosity is in the specified range, the substance can be used as such. If the viscosity is outside the specified range, it should be adjusted according to the intended use.

The invention is illustrated below in detail with reference to Examples, wherein some embodiments of this invention are described with respect to double-capsules containing a color former and a color developer for use in pressure sensitive recording sheets. It is possible to prepare other types of double-capsules by the present process. For instance, primary capsules containing a colored dye are dispersed in a liquid dispersion of a white powder and the resulting dispersion is encapsulated to form apparently white double-capsules which can be coated on a paper sheet to be transferred to other paper sheets. There is known a self-contained adhesive in which one of the components of a separate application type adhesive is encapsulated and dispersed in the other component. This dispersion can be encapsulated to form double-capsules. The examples given hereunder are illustrative and not limitative.

EXAMPLE 1

(1) At first, primary capsules to be enclosed in double-capsules were prepared by the in situ method using a urea-formaldehyde polymer as the wall material.

Into 100 parts of a 10% aqueous solution of ethylene-maleic anhydride copolymer ("EMA-31", a trademark for Monsanto Chemical Co.), were dissolved 200 parts of water, 10 parts of urea and 1 part of resorcinol. The resulting aqueous solution was adjusted to pH 3.5 with a 20% aqueous sodium hydroxide solution. An internal phase comprising 20 parts of Crystal Violet Lactone dissolved in 180 parts of a diarylethane-type oil ("Hisol SAS", a trademark for Nippon Petrochemicals Co., Ltd.) was added to the above aqueous solution and emulsified to an average particle size of 2 to 3 microns by means of homogenizer. When an approximately uniform particle size was attained, the emulsion was added with 26 parts of a 37% aqueous formaldehyde solution and heated with stirring in a water bath at 55° C. for 3 hours. The mixture was then left standing and allowed to cool down to room temperature to obtain microcapsules with a wall membrane of a urea-formaldehyde polymer, the solid content of the microcapsules dispersion having been about 40%.

(2) a 40% solution of a p-phenylphenol resin in a diarylethane-type oil was prepared for use as a hydrophobic substance in which the microcapsules obtained in (1) was to be dispersed in producing double-capsules. To 50 parts of the above 40% p-phenylphenol resin solution having a viscosity of 850 cps at 25° C., was added 50 parts of the 40% microcapsule dispersion. The mixture was preliminarily stirred. This was a step preliminary to the subsequent emulsifying step where the primary capsules are enclosed in double-capsules of an intended average diameter. The preliminary stirring must be performed while observing under an optical microscope. After sufficient stirring had been performed, the mixture was added to 60 parts of a 10% aqueous ethylene-maleic anhydride polymer solution and emulsified by means of homogenizer. Upon observation under an optical microscope, it was confirmed that the emulsified particles contained each from 1 up to 10 primary capsules. Then immediately, to the emulsion was added gradually an aqueous solution containing 5 parts of urea and 0.5 part of resorcinol dissolved in 100 parts of water. After addition of 13 parts of a 37% aqueous formaldehyde solution, the emulsion was heated with stirring in a water bath at 55° C. After 4 hours, the heat source was turned off and the emulsion was left standing and allowed to cool to room temperature. The solids content of the double-capsules dispersion thus obtained was about 30%. Each capsules included microcapsules containing a colorless dye as the core substance and a color developer surrounding the microcapsules, corresponding to a capsule for use in a so-called self-contained pressure sensitive recording paper.

(3) To coat a paper sheet with the double-capsules produced in (2), a coating composition was prepared from 40 parts of a 30% double capsule dispersion, 30 parts of wheat starch, 40 parts of a 10% aqueous oxidized starch solution and 80 parts of water. The coating composition was applied by means of a Meyer bar onto a paper sheet. On application of pressure, the coated sheet developed color of an intensity sufficient for use as a self-contained pressure sensitive recording paper.

The coated paper showed good transferability probably because of the existence of a color former and a color developer in close proximity to each other in the same capsule. When the coated sheet was superposed with the coated side downward upon a sheet of fine paper and a localized pressure was applied with a typewriter onto the top side, a colored sharp image was formed on the undersheet. A corresponding colored image also remained on the coated side of the top sheet, indicating that the coated sheet is useful in preventing falsification.

EXAMPLE 2

Double-capsules were prepared using the microcapsules produced in Example 1-(1) and in the same manner as in Example 1, except that a 60% p-phenylphenol resin solution (viscosity, 120,000 cps at 25° C.) obtained by dissolving a p-phenylphenol resin in diisopropylnaphthalene ("KMC oil", a trademark for Kureha Chemical Co.) was used in place of the 40% p-phenylphenol resin solution. The resulting doublecapsules contained each at most 10 primary capsules and had a particle size of 2 to 10 microns.

COMPARATIVE EXAMPLE 1

Double-capsules were tried to prepare in the same manner as in Example 1 using the primary capsules produced in (1), except that a 10% p-phenylphenol resin solution was used in place of the 40% p-phenylphenol resin solution of Example 1-(2). The viscosity of said 10% p-phenylphenol solution was 20 cps at 25° C. The primary capsules were mixed with the p-phenylphenol resin solution, then stirred preliminarily, added to a 10% aqueous ethylene-maleic anhydride copolymer solution, and emulsified. However, the p-phenylphenol resin solution dispersed in the aqueous solution independently of the primary capsules and the final product was not the intended double-capsules but a mixture of the primary capsules and the microcapsules containing the p-phenylphenol resin solution.

COMPARATIVE EXAMPLE 2

A trial was made to prepare double-capsules in the same manner as in Example 1, except that a 70% p-phenylphenol resin solution was used in place of the 40% p-phenylphenol resin solution. It was impossible to disperse the primary capsules in the preliminary stirring step and the experiment was discontinued before entering the emulsifying step. The viscosity of the above 70% p-phenylphenol resin solution was 500,000 cps at 25° C.

EXAMPLE 3

(1) Primary capsules to be enclosed in the double-capsules were prepared by the interfacial polymerization method. Into a solution containing 10 parts of Crystal Violet Lactone in 100 parts of diarylethanetype oil, was dissolved 25 parts of a polyisocyanate ("Coronate HL", a trademark for Nippon Polyurethane Co.) to obtain an internal phase oil for the primary capsules. The resulting internal phase oil was added to 150 parts of a 5% aqueous solution of a cation-modified ureaformaldehyde resin ("Sumirez resin 614", a trademark for Sumitomo Chemical Co.) and emulsified by means of homogenizer. After addition of 250 parts of a 20% aqueous solution of a polyamide-epichlorohydrin resin ("Epinox P-130", a trademark for Dic Hercules Co.), the emulsion was heated with stirring at 60° C. for 3 hours. There was obtained microcapsules having an average particle size of 2 to 3 microns and a solid content of about 30%.

(2) Double-capsules were prepared using as the primary capsules the microcapsules obtained by the interfacial polymerization method in (1).

To 50 parts of a 30% p-phenylphenol resin solution in a diarylethane-type oil, was added 150 parts of 30% primary capsules dispersion. After having been confirmed that preliminary dispersion had been attained, the mixture was added to a mixture of 50 parts of a 10% aqueous ethylene-maleic anhydride copolymer solution and 100 parts of water, which had been adjusted to pH 4.0 with a 20% sodium hydroxide solution. The mixture was emulsified by means of homogenizer. After confirming under an optical microscope that the emulsified particles each contained 1 to 10 or several more primary capsules, the emulsion was stirred in a water bath at 55° C. To the emulsion, while being stirred, was added 10 parts of melamine followed by 14 parts of a 37% aqueous formaldehyde solution. The emulsion was maintained at a temperature of 55° C. for 3 hours to allow the reaction to proceed. Then, the heat source was turned off and the emulsion was left standing and allowed to cool. The solid content of the resulting double-capsules dispersion was about 30%.

(3) The double-capsules produced in (1) were coated on a paper sheet.

A coating composition was prepared by thoroughly mixing 40 parts of a 30% double-capsules dispersion, 30 parts of wheat starch, a 10% aqueous solution of oxidized starch and 80 parts of water. The coating composition was applied onto a paper sheet by means of a Meyer bar. The coated surface was white and the intensity of colored image was sufficiently high for use as a self-contained pressure sensitive recording sheet.

EXAMPLE 4

(1) Primary capsules to be enclosed in double-capsules were prepared by the complex coacervation method.

To a 10% aqueous solution of acid-treated gelatin (isoelectric point, pH 9.0; Bloom strength, 250-300 g) at 50° C., which had been adjusted to pH 9.7, was added 80 parts of a diarylethane-type oil containing 8 parts of Crystal Violet Lactone dissolved therein. The mixture was emulsified with vigorous stirring to form an O/W emulsion until the average droplet size had become 3 microns. To the emulsion, were added 8 parts of a 50% aqueous solution of poly(vinyl methyl ether-maleic anhydride), which had been adjusted to pH 10.0, and 60 parts of a 5% aqueous solution of sodium carboxymethylcellulose (average molecular weight, 225,000; etherification degree, 0.6) followed by 164 parts of water at 55° C. The pH of the resulting mixture was adjusted to 0.7 with 20% sodium hydroxide solution and then gradually decreased by adding with stirring a 20% aqueous acetic acid solution to form a wall forming material around the droplets. After completion of the formation of wall membrane, the mixture was cooled to 10° C. to cause gelation of the capsule wall. To the mixture was then added 5 parts of a 37% aqueous formaldehyde solution. After 5 hours, pH of the mixture was raised to 10.0 with a 20% sodium hydroxide solution to harden the wall membrane. The solids content of the resulting microcapsules was about 20%.

(2) Double-capsules enclosing the primary capsules obtained in (1) were prepared.

To 50 parts of a 50% p-phenylphenol resin solution in a diarylethane-type oil, which had a viscosity of 7,000 cps at 25° C., was added 100 parts of the 20% primary capsules obtained in (1). After thorough dispersion by preliminarily stirring, the mixture was added into a mixture of 20 parts of a 25% aqueous solution (prepared to pH 4.5 with 20% sodium hydroxide solution) of polyacrylic acid ("Acrysol A-3", a trademark for Rohm and Haas Co.; molecular weight, below about 150,000) and 130 parts of water. The resulting mixture was emulsified and it was confirmed under an optical microscope that the emulsified droplets contained each 1 to 10 or several more primary capsules. To the emulsion maintained at 55° C. in a water bath, were added successively 20 parts of a methylolmelamine resin ("Resimene 817", a trademark for Monsanto Chemical Co.) and 15 parts of a 37% aqueous formaldehyde solution. After 2 hours of heating in the water bath at 55° C., the heat source was turned off to allow the emulsion to cool down. There were obtained double capsules dispersion having a solids content of about 30%.

(3) A coating composition was prepared in the same manner as in Example 3-(3) and coated on a paper sheet. The coated sheet exhibited a colored image of high density, indicating usefulness of the sheet as a self-contained pressure sensitive recording sheet.

What is claimed is:

1. An improved process for producing double-capsules which comprises the following steps:
    (a) preparing a dispersion of primary microcapsules containing as a core material a hydrophilic substance or a hydrophobic substance;
    (b) mixing said dispersion of primary microcapsules with a second hydrophobic substance which may be the same as or different from the first names hydrophobic substance to disperse said primary microcapsules in the second hydrophobic substance which displaces a medium of the dispersion of primary microcapsules, the viscosity of the second hydrophobic substance being from 40 to 150,000 cps at 25° C.;
    (c) enclosing the primary microcapsules dispersed in the second hydrophobic substance with a wall membrane formed by in-situ polymerization using wall membrane-forming monomers all of which are included in a medium dispersing or emulsifying said second hydrophobic substance to form double capsules.

2. A process according to claim 1, wherein the wall membrane of the double-capsules formed by the in-situ polymerization method is selected from the group consisting of a urea-formaldehyde polymer, melamine-formaldehyde polymer, and methylolmelamine-formaldehyde polymer.

3. A process according to claim 2, wherein the viscosity of the second hydrophobic substance is 100 to 10,000 cps at 25° C.

4. A process according to claim 3, wherein the second hydrophobic substance is selected from a liquid substance selected from the group consisting of vegetable oils, animal oils, mineral oils, synthetic oils, fragrances, reactants, and dispersions of various solids in such liquid substance.

5. A process according to claim 1, wherein the viscosity of the second hydrophobic substance in 100 to 10,000 cps at 250° C.

6. A process according to claim 1, wherein the second hydrophobic substance is selected from a liquid substance selected from the group consisting of vegetable oils, animal oils, mineral oils, synthetic oils, fragrances, reactants, and dispersions of various solids in such liquid substance.

* * * * *